United States Patent [19]

Tinsler

[11] E Re. 30,999

[45] Reissued Jul. 20, 1982

[54] HUMIDIFER DRIVE SYSTEM

[75] Inventor: Theodore E. Tinsler, Sidney, Ohio

[73] Assignee: White-Westinghouse Corporation, Pittsburgh, Pa.

[21] Appl. No.: 183,760

[22] Filed: Sep. 3, 1980

Related U.S. Patent Documents

Reissue of:

[64] Patent No.: 4,112,015
Issued: Sep. 5, 1978
Appl. No.: 790,012
Filed: Apr. 22, 1977

U.S. Applications:

[63] Continuation of Ser. No. 597,527, Jul. 21, 1975, abandoned.

[51] Int. Cl.[3] ..... B01F 3/04

[52] U.S. Cl. ..... 261/92; 261/24

[58] Field of Search ..... 261/24, 28–30, 261/36 R, 80, 92, DIG. 15; 55/440; 126/113

[56] References Cited

U.S. PATENT DOCUMENTS

| | | | |
|---|---|---|---|
| 1,905,101 | 4/1933 | Johnson | 261/92 |
| 2,002,553 | 5/1935 | Somers | 55/440 X |
| 2,221,003 | 11/1940 | Massey | 261/92 X |
| 2,232,586 | 2/1941 | Alguire | 261/92 X |
| 2,437,936 | 3/1948 | Carraway | 261/92 |
| 2,548,694 | 4/1951 | Wiesenthal | 261/92 X |
| 2,730,341 | 1/1956 | Roe | 261/92 X |
| 2,910,279 | 10/1959 | Wood | 261/92 X |
| 3,598,370 | 8/1971 | Hoag | 261/92 X |
| 3,730,497 | 5/1973 | Schmitt et al. | 261/92 X |

*Primary Examiner*—Richard L. Chiesa
*Attorney, Agent, or Firm*—LeBlanc, Nolan, Shur & Nies

[57] ABSTRACT

A drive system in a humidifier of the portable console type having a large drum or media wheel rotatable on a horizontal axis through a water reservoir and a fan providing air flow through the media wheel, the drive system including a high speed reduction belt and pulley system interconnecting the fan motor and the media wheel.

18 Claims, 3 Drawing Figures

HUMIDIFER DRIVE SYSTEM

Matter enclosed in heavy brackets [ ] appears in the original patent but forms no part of this reissue specification; matter printed in italics indicates the additions made by reissue.

This application is a continuation of application Ser. No. 597,527, filed July 21, 1975, now abandoned.

BACKGROUND OF THE INVENTION

Console humidifiers of the portable type having a cabinet enclosing a motor and fan and a large diameter, drum or media wheel rotatable through a water reservoir commonly employ either two motors, one for high speed fan rotation and another for relatively very low speed media wheel rotation, or a gear drive reduction from a single fan motor to rotate the media wheel at a very slow speed. Examples of a dual motor drive system in a console humidifier are found in prior U.S. Pat. Nos. 3,471,133; 3,598,370; and 3,596,886. Such humidifier drive systems are more expensive than necessary, due to the requirement of a second motor to drive the media wheel. Gear reduction systems such as the type disclosed in U.S. Pat. Nos. 3,610,589 and 3,756,579 are similarly expensive, although the need for a second motor is eliminated.

Another method, which employs a louvered faced media wheel driven by air flow from a fan behind the wheel thus eliminating any positive drive for the media wheel is disclosed in U.S. Pat. No. 3,730,497.

The broad concept of providing a single motor to drive a fan and a drum or media wheel by a reduction speed pulley and belt system is disclosed in prior U.S. Pat. No. 1,905,101. However, the disclosed drive system provides only a very low ratio speed differential and the drive system components are quite different in structure and arrangement from those of the present invention.

Other disclosures of single motors driving two or more components of humidifier or air conditioning systems are found in prior U.S. Pat. Nos. 1,747,694; 1,888,001; 2,232,586; 2,300,580; 2,548,694; 2,823,907; and 3,038,708.

However, the prior art does not disclose the very simple yet highly reliable drive system of the present invention which further provides a very significant cost savings in the manufacture of portable, console humidifiers.

SUMMARY OF THE INVENTION

It is a primary object of this invention to provide a low cost belt and pulley drive system for rotating the media wheel from the fan motor of a portable humidifier wherein the need for a second motor or a gear reduction system is eliminated.

It is another object of the invention to provide a high speed reduction belt and pulley system for the media wheel of a console humidifier wherein a sturdy, common support structure is provided for both the fan and motor and the belt and pulley system.

It is a further object of the invention to provide a high speed reduction belt and pulley system interconnecting the media wheel and fan motor of a console humidifier wherein fan and wheel directions of rotation may be easily reversed.

Still another object of the invention is to provide a simple high speed reduction belt and pulley system interconnecting the media wheel and fan motor of a console humidifier wherein the rear end of the fan motor shaft is employed to drive the belt and pulley system.

Yet a further object of the invention is to provide a high speed reduction belt and pulley system interconnecting the fan motor and media wheel of a humidifier wherein the speed reduction ratio of the belt and pulley system is on the order of 150 to 1.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

DESCRIPTION OF THE PREFERRED EMBODIMENT

Figure 1:
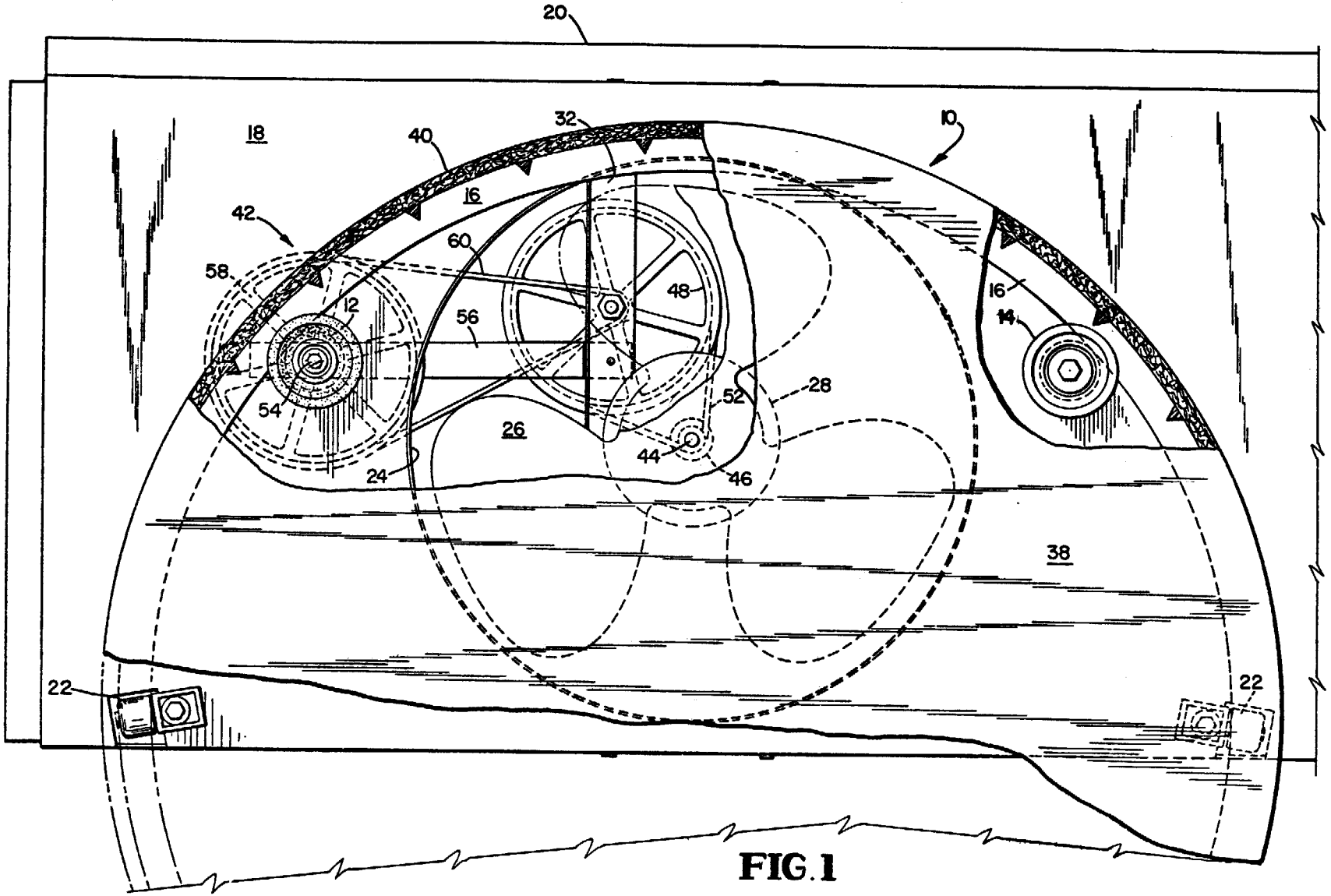
FIG. 1 is a partial, front elevation view of an embodiment of the invention with parts broken away to show further interior details.

Within the cabinet (not shown) of a console humidifier is a relatively large diameter media wheel 10 suspended on grooved rollers 12, 14, one of which is ordinarily a friction drive roller, as shown at 12. Media wheel 10 is arranged to rotate with a lower sector thereof always disposed within a water reservoir (not shown). An interior peripheral flange of wheel 10 forms a circular rail 16 interfitting the grooves of rollers 12, 14 respectively. Rollers 12, 14 are disposed on the front side of and are mounted on an upright panel 18 of a support housing 20 which may also include idler guide rollers 22 form maintaining media wheel 10 in a vertical attitude, spaced from housing 20 as wheel 10 rotates.

A central opening or plenum 24 is provided in panel 20, within which is disposed a three bladed fan 26 driven by fan motor 28 (A conventional 60 cycle induction motor) therebehind which, in turn, is on a pair of spaced apart vertical members 30, 32 secured to the housing 20. Members 30, 32 may be resiliently mounted on the support housing 20 by shock absorbers 34 which aid in substantially reducing vibration and noise imparted to housing 20 and the humidifier cabinet (not shown) by operation of the fan and its motor.

Of course, the operation of fan motor 28 is controlled via wire leads 36 from suitable controls, which may include multi-speed controls, an automatic humidistat and a shut off control (not shown). In addition, the controls may include a water level indicator or refill indicator light for signalling the amount of water in the reservoir (not shown).

During operation, the fan draws air in from the rear of the unit, passes the air through the plenum opening to the interior of and directed against the inner surface of the media wheel 10. The integral front wall of wheel 10 provides an impervious baffle 38 which diverts the air flow through the caged perphery of wheel 10 which is encasd by a removable filter belt 40, which is continuously wetted as it rotates through the water reservoir (not shown). Obviously, the air becomes moisture laden as it passes through filter belt 40. Suitable grillwork (not shown) in the humidifier cabinet (not shown) then directs the humidified air into the room or enclosure where the humidifier is placed.

Figure 3:
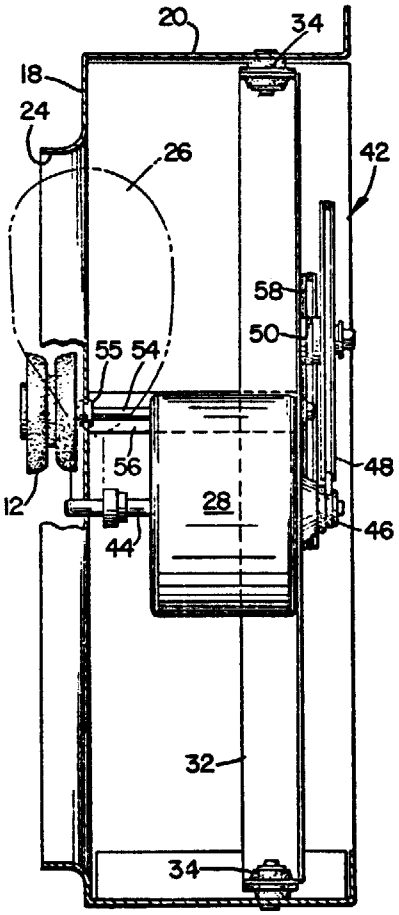
FIG. 3 is a section view taken substantially along lines 3—3 of FIG. 2.

The media wheel 10 is slowly rotated by drive roller 12 from motor 28 through a high speed reduction belt and pulley drive system, generally denoted at 42. On the end of motor drive shaft 44, opposite fan 26, is mounted a first, small diameter pulley 46. A relatively large diameter pulley 48 is rotatably mounted on one of the support members 32 and includes a third, greatly reduced diameter pulley 50 concentrically rigid with or otherwise fixed thereto for rotation with the large pulley 48. Pulleys 48 and 50 may be integrally formed as a one piece member. A first drive belt 52 interconnects pulleys 46 and 48 which are coplanarly arranged (FIG. 3).

The driving roller 12 is non-rotatably fastened on one end of an elongate drive shaft 54 which projects rearwardly through a plastic bearing 55 in panel 18. The rear end of shaft 54 extends through and is journalled in a second plastic bearing similar to bearing 55 mounted in bracket arm 56 which is in turn secured to member 32 and to the housing panel 18. A fourth large diameter pulley 58 is non-rotatably fixed to the rear end of the drive pulley shaft 54, pulley 58 being arranged coplanar with the small pulley 50. A second drive belt 60 interconnects pulleys 50 and 60.

Figure 2:
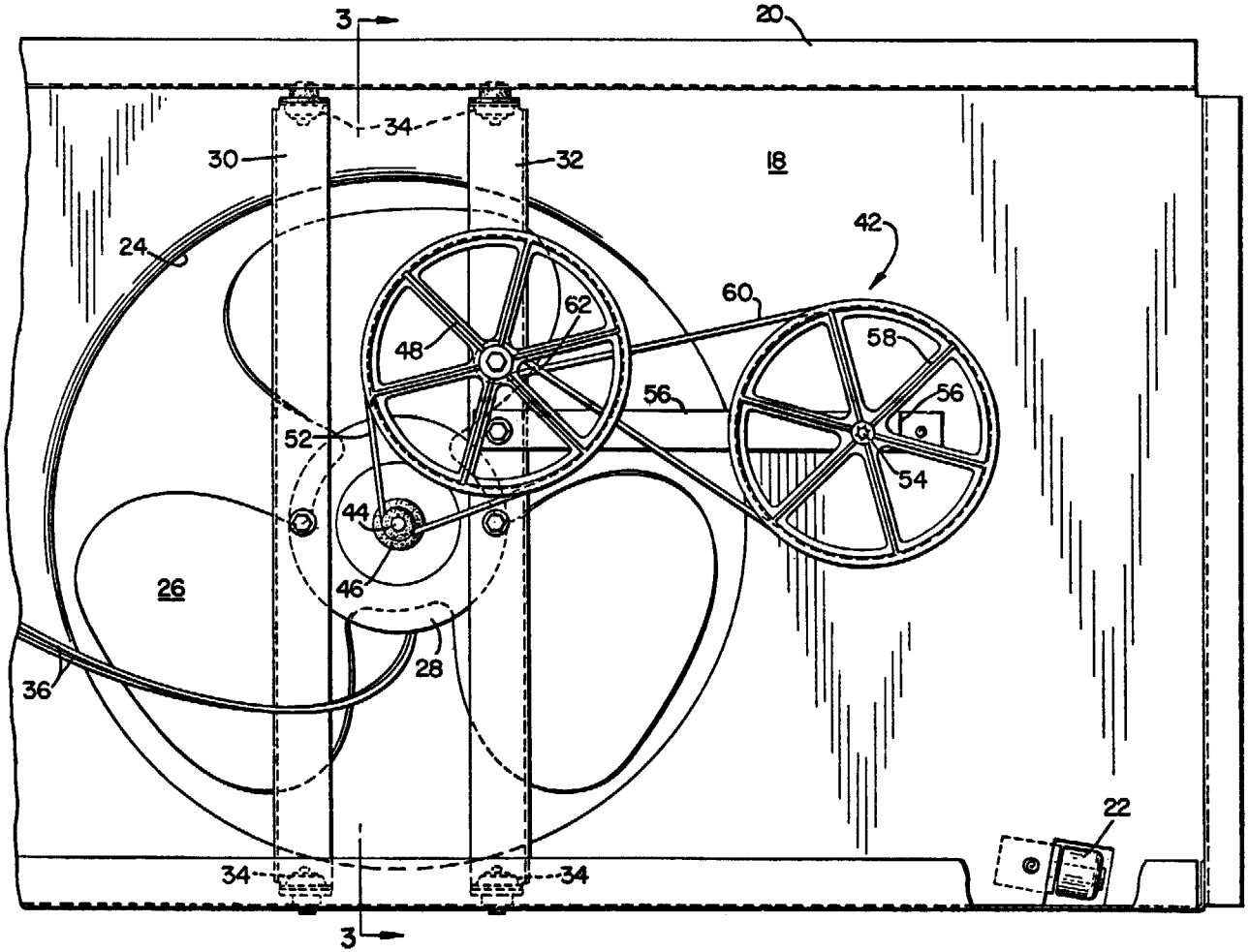
FIG. 2 is a partial, rear elevation of the embodiment of the invention as shown in FIG. 1.

Both of belts 52 and 60 may be made of flexible material such as plastic and be circular in cross section. By installing belt 60 with a single twist as depicted in FIG. 2, media wheel 10 may be driven in reverse with respect to the direction of rotation of fan 26 (FIG. 2 at 62). FIG. 1 illustrates belt 60 without a twist, which provides a driven for the media wheel having the same direction of rotation as the fan.

For even further economy in manufacture, pulleys 48 and 58 may be of equal diameter and similarly formed. All of the pulleys may be made of plastics materials to reduce the effects of wear by friction.

This relatively simple high speed reduction system is capable of an extremely large reduction in speed of rotation. In the embodiment shown, rotation of fan motor shaft 44 is reduced by a ratio of 150 to 1, from the standard 1500 rpm of the induction motor 28 to a media wheel drive roller rotation of only 10 rpm. At the same time, a positive drive for media wheel 10 is provided without any need for a second media drive motor or expensive, reduction gearing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a humidifier of the type embodying a rotatable media wheel rotating on a horizontal axis so a lower sector passes through a water reservoir and in which humidifier an airflow path is provided from exterior of the humidifier to and through the water soaked portion of the rotating media wheel above the reservoir to a humidified air exhaust path from the humidifier, the improvement comprising: a humidifier interior structure having an upright division panel including a central opening providing an air flow passage to the media wheel; means, including drive roller means on the outer side of said panel, for rotatably supporting and driving said media wheel, and a drive roller driving shaft coaxially secured to said drive roller means; a rotary electric motor, said motor having a rotary motor shaft each end of which projects from respective ends of the motor; a fan mounted on and rigidly secured on one end of the motor shaft disposed concentric with and adjacent said panel opening to force air through the opening; a plural belt and pulley high speed reduction drive system, with input and output pulleys, located on the opposite side of said panel from said media wheel with its input pulley directly secured on the other end of the motor shaft and its output pulley secured on said roller driving shaft; and means on said panel mounting said motor, said drive roller shaft and said high speed reduction drive system on said opposite side of said panel.

2. In a humidifier of the type embodying a rotatable media wheel having a lower sector disposed in a reservoir of water and in which an annular media wheel rotates on a horizontal axis with a lower sector passing through the water reservoir and in which humidifier an airflow path is provided from exterior of the humidifier to and through the water soaked portion of the rotating media wheel above the reservoir to a humidified air exhaust path from the humidifier, the improvement comprising: a humidifier interior housing having at its front side an upright panel with an outer side and an inner side including an air admission opening providing an air flow passage to the media wheel; means, including drive roller means on the outer side of said panel, for rotatably supporting and driving said media wheel surrounding the air flow path through the air admission opening, and a drive roller driving shaft coaxially secured to said drive roller means and extending through the panel into the housing; a rotary electric motor and mounting structure secured to the inner side of said panel mounting said motor on and within the housing, said motor having a motor shaft with opposite ends projecting from respective ends of the motor and coaxial with said panel opening; a fan directly secured on and coaxial with one end of the motor shaft so it is disposed concentric with and adjacent said panel opening and operative to provide an airflow through the opening from the inner side of the panel to the outer side of the panel; and a plural belt and pulley high speed reduction drive system within the housing connecting the other end of the motor shaft to said roller driving shaft, with one pulley being directly secured to the other end of said motor shaft and providing the drive power from said motor to the plural belt and pulley system.

3. In the humidifier defined in claim 2, said mounting structure provides a common support means secured on the inner side of the housing panel for mounting said motor, said drive system and the drive roller shaft.

4. In the humidifier defined in claim 3, said common support means comprising a pair of vertically disposed spaced apart members for mounting said motor and a portion of said drive system and a bracket arm extension rigidly secured to one of said members and to said housing panel for mounting an end of said drive roller shaft opposite said drive roller means and the remainder of said drive system.

5. In the humidifier defined in claim 4, said drive system comprising a first reduction belt and pulley assembly having a first drive pulley fixed on said motor shaft and a second pulley rotatably mounted on said one spaced apart member, and a second reduction pulley assembly having a third pulley fixed to said second pulley and a fourth pulley mounted on said drive roller shaft end extended into said housing.

6. In the humidifier defined in claim 5, at least the belt of said second reduction pulley assembly being made of flexible material and being circular in cross-section whereby said second reduction pulley assembly belt may be reversely trained to rotate said fourth pulley in a direction opposite that of said third pulley.

7. In the humidifier defined in claim 5, the diameters of said second and fourth pulleys being significantly larger than the diameters of said first and third pulleys.

8. In the humidifier defined in claim 7, the relative diameters of all of said pulleys being such that the speed reduction in rotation of said motor shaft with respect to said drive roller means shaft is on the order of 150 to 1.

9. In the humidifier defined in claim 5, said second and third pulleys being integrally joined to thereby form a one piece, dual diameter pulley.

10. In the humidifier defined in claim 2, said drive system comprising a first reduction belt and pulley assembly having a first small diameter drive pulley fixed on said motor shaft and a second large diameter pulley rotatably mounted on said housing, and a second reduction pulley assembly having a third small diameter pulley fixed for rotation with said second pulley and a fourth large diameter pulley mounted on said drive roller shaft opposite end.

11. In the humidifier defined in claim 10, at least the belt of said second reduction pulley assembly being made of flexible material and being circular in cross-section whereby said second reduction pulley assembly belt may be reversely trained to rotate said fourth pulley in a direction opposite that of said third pulley.

12. In the humidifier defined in claim 10, the relative diameters of all of said pulleys being such that the speed reduction in rotation of said motor shaft with respect to said drive roller means shaft is on the order of 150 to 1.

13. In a humidifier of the type having a media wheel rotatable about a substantially horizontally disposed axis through a reservoir of water located therebeneath, a lower sector of said media wheel being disposed in the water in said reservoir and in which humidifier an airflow path is provided from exterior of the humidifier to and through the water soaked portion of the rotating media wheel above the reservoir to a humidified air exhaust path from the humidifer, the improvement comprising: a generally rectangular housing having an upright panel located above said reservoir and behind said media wheel, roller means on the outer side of said panel for rotatably suspending said media wheel on said housing, a generally circular air exhaust plenum opening defined in said panel; an electric motor disposed in said housing centrally with respect to said plenum opening, said motor including a drive shaft extending from both ends of the motor; bracket means fastened to said motor and mounting the motor in said central disposition in the housing comprising a pair of generally vertically positioned and spaced apart members secured to said housing by resilient means for reducing vibration caused by operation of said motor; a fan directly secured coaxially on one end of the drive shaft, said fan being disposed substantially concentrically within said plenum chamber; and drive train means for transmitting rotation from the other end of the motor drive shaft to one of the roller means suspending the media wheel at a greatly reduced speed with respect to the rotation of the drive shaft, comprising, a first pulley on the other end of the motor drive shaft, a second pulley freely rotatably mounted on one of said spaced apart members, coplanarly aligned with said first pulley and having a significantly larger diameter with respect thereto, first drive belt means trained about said first and second pulleys, a third pulley arranged concentrically with and rigidly fixed to said second pulley and having a greatly reduced diameter with respect thereto, an elongate shaft fixed to said one roller means and extending rearwardly through and rotatably mounting said one roller means on the housing upright panel, a bracket arm secured to the housing upright panel, adjacent said elongate shaft, and to said one spaced apart member, the end of said elongate shaft opposite said one roller being also rotatably mounted in said bracket arm, a fourth pulley fixed to said elongate shaft opposite end being arranged coplanar with said third pulley and having a significantly larger diameter with respect thereto and second drive belt means trained over said third and fourth pulleys.

14. In the humidifier defined in claim 13, said second and third pulleys being formed as an integral, one piece member.

15. In the humidifier defined in claim 14, said second and fourth pulleys being of equal diameter.

*16. In a humidifier of the type embodying a rotatable media wheel rotating on a horizontal axis so that a lower sector passes through a water reservoir and in which humidifier an airflow path is provided from the exterior of the humidifier to and through the water soaked portion of the rotating media wheel above the reservoir to a humidified air exhaust path from the humidifier, the improvement comprising: a support structure having an upright panel provided with an opening, a media wheel at one side of the panel, means including drive roller means at said one side of said panel for rotatably supporting and driving said media wheel in operative association with said opening, a driving shaft for said drive roller means having bearing support on said panel and extending through said panel, an electric motor mounted on said support structure, said motor having a rotary motor shaft each end of which projects from respective ends of the motor; a fan mounted on and fixedly secured on one end of the motor shaft disposed concentric with and adjacent said panel opening to force air through the opening toward said media wheel, a plural belt and pulley high speed reduction drive system, with input and output pulleys located on the opposite side of said panel from said media wheel and with an input pulley directly secured on the other end of said motor shaft and an output pulley secured on said roller driving shaft.*

*17. In a humidifier of the type embodying a rotatable media wheel having a lower sector disposed in a reservoir of water and in which an annular media wheel rotates on a horizontal axis with a lower sector passing through the water reservoir and in which humidifier an airflow path is provided from the exterior of the humidifier to and through the water soaked portion of the rotating media wheel above the reservoir to a humidified air exhaust path from the humidifier, the improvement comprising: a housing structure having an upright panel including an air admission opening providing air flow from one side of said panel to the other side of said panel, roller means including drive roller means mounted on said housing structure at said other side of said panel, a rotatable media wheel mounted on said roller means and being adapted to be rotated by said drive roller means in the path of air entering said opening, a drive roller driving shaft having bearing support in said*

*panel coaxially secured to said drive roller means and extending through the panel, an electric motor on said housing structure, said motor having a motor shaft with opposite ends projecting from respective ends of the motor and coaxial with said panel opening, a fan directly secured on and coaxial with one end of the motor shaft so that it is disposed concentric with and adjacent said panel opening and operative to provide an airflow through the opening into said media wheel, and a plural belt and pulley high speed reduction drive system disposed on the side of said panel opposite said media wheel for connecting the other end of the motor shaft to said roller driving shaft, with one pulley being directly secured to the other end of said motor shaft and providing the drive power from said motor to the plural belt and pulley system.*

*18. In a humidifier of the type embodying a rotatable media wheel rotating on a horizontal axis so that a lower sector passes through a water reservoir and in which humidifier an airflow path is provided from the exterior of the humidifier to and through the water soaked portion of the rotating media wheel above the reservoir to a humidified air exhaust path from the humidifier, the improvement comprising a support structure comprising a vertical panel having means defining an opening, an electric motor mounted on said support structure and having rotatable output shafts projecting at opposite ends thereof, a fan secured on one of said shafts and disposed substantially in said opening defining means, roller means mounting a media wheel for rotation about a horizontal axis at one side of said panel closely adjacent said opening and comprising a drive roller on a drive roller shaft that extends through said panel, said media wheel being axially open at one end adjacent said opening and axially closed at the other end, and a high speed reduction pulley system mounted on said support structure at the other side of said panel from said roller means and comprising an input pulley secured upon the other shaft of said motor and an output pulley secured upon said drive roller shaft, whereby when said motor is actuated said fan draws air from said other side of the panel through said opening into said media wheel with the air becoming moisture laden as it passes through the periphery of said media wheel into the exhaust path, and none of said motor, fan or pulley system are subjected to said moisture laden air.*

* * * * *